(12) United States Patent
Tabata et al.

(10) Patent No.: US 7,719,711 B2
(45) Date of Patent: May 18, 2010

(54) IMAGE DATA PROCESSING APPARATUS AND METHOD

(75) Inventors: Sunao Tabata, Mishima (JP); Shunichi Megawa, Tagata-gun (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1082 days.

(21) Appl. No.: 11/392,939

(22) Filed: Mar. 30, 2006

(65) Prior Publication Data

US 2007/0236706 A1 Oct. 11, 2007

(51) Int. Cl.
G06F 15/00 (2006.01)
H04N 7/14 (2006.01)

(52) U.S. Cl. .................................... 358/1.2; 348/14.09

(58) Field of Classification Search .................. 358/1.1, 358/1.6, 462, 1.2, 3.06, 1.15, 453; 382/240; 375/240.25, 240.26, 240.2, 240.21, 240.23; 707/104.1, 348; 348/14.09, 565, 473, 180, 348/405.1; 709/231, 247

See application file for complete search history.

(56) References Cited

U.S. PATENT DOCUMENTS 6,342,950 B1 * 1/2002 Tabata et al. ................. 358/1.6

| 7,190,486 B2 | 3/2007 | Tabata et al. |
| 2004/0174555 A1 | 9/2004 | Tabata et al. |
| 2007/0002339 A1 | 1/2007 | Megawa et al. |

FOREIGN PATENT DOCUMENTS

| JP | 2000-175061 A | 6/2000 |
| JP | 2003-338934 A | 11/2003 |

\* cited by examiner

*Primary Examiner*—Saeid Ebrahimi Dehkordy
(74) *Attorney, Agent, or Firm*—Foley & Lardner LLP

(57) ABSTRACT

There is provided a decoding apparatus and a decoding method which are for using compressed data efficiently by making the resolutions of the individual components differ from one another. A decoding apparatus decodes compressed data that represents an image signal composed of a plurality of components as a compressed code by making the resolutions of the individual components differ from one another. The decoding apparatus basically comprises input sections 5-Y, 5-I, 5-Q which decode compressed data and take in the individual components independently, a reduction circuit 5-Y-1 which reduces and changes a size corresponding to the processing unit and resolution of any one of the components, and a conversion section 5-6 which converts into a decoded image signal in a specific format by using reduced components and uncompressed components.

9 Claims, 17 Drawing Sheets

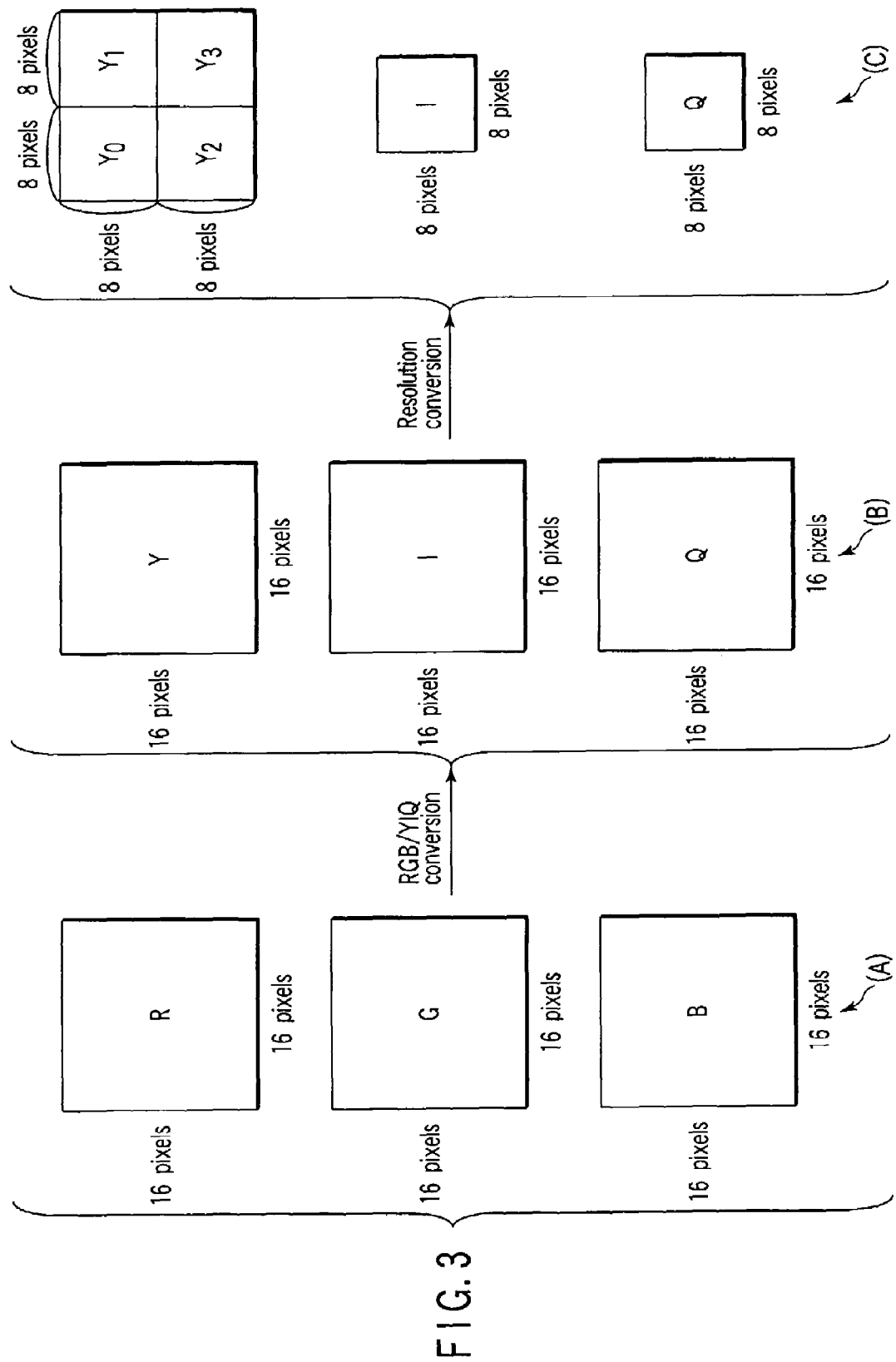
F I G. 3

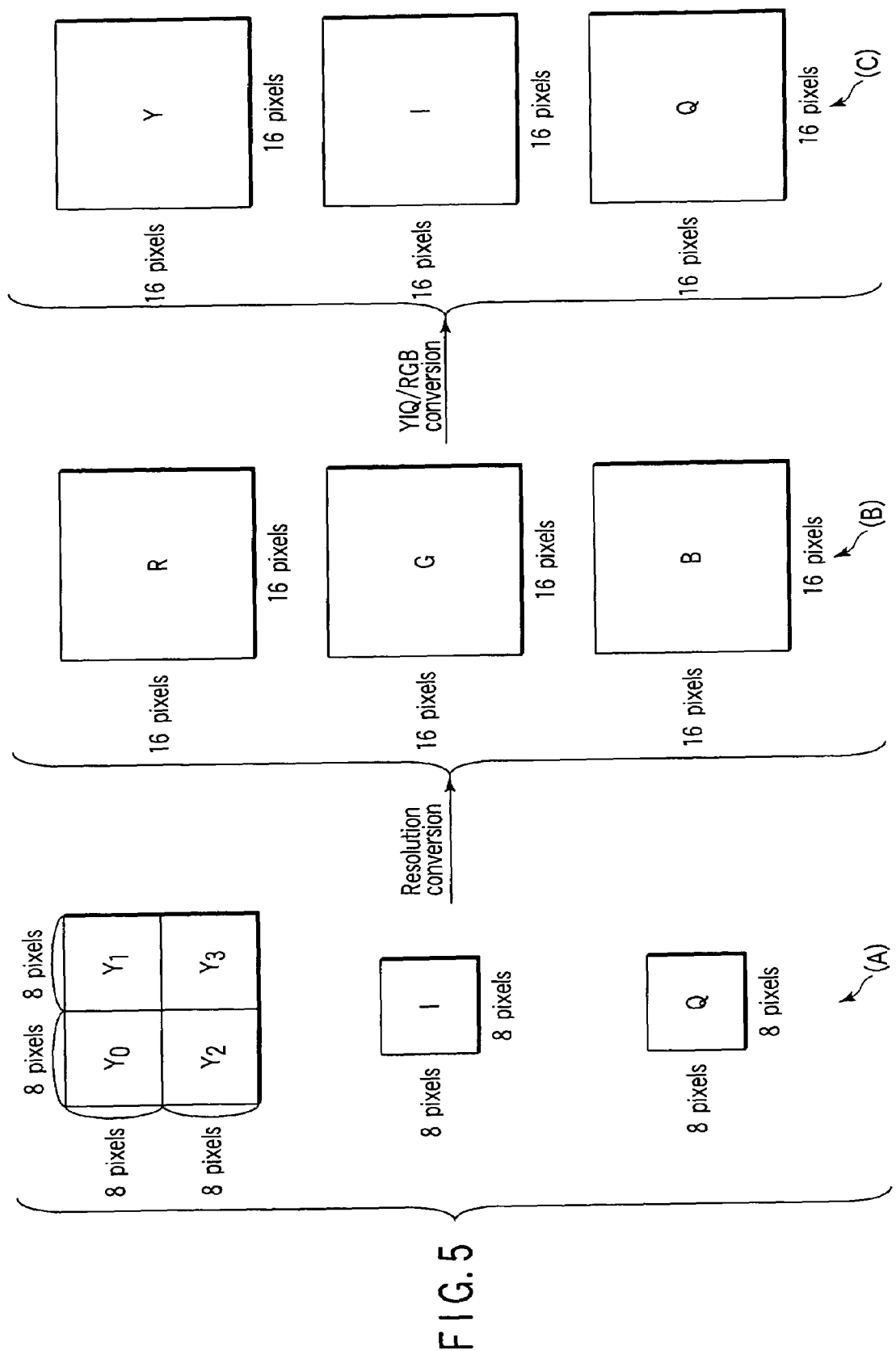
F I G. 5

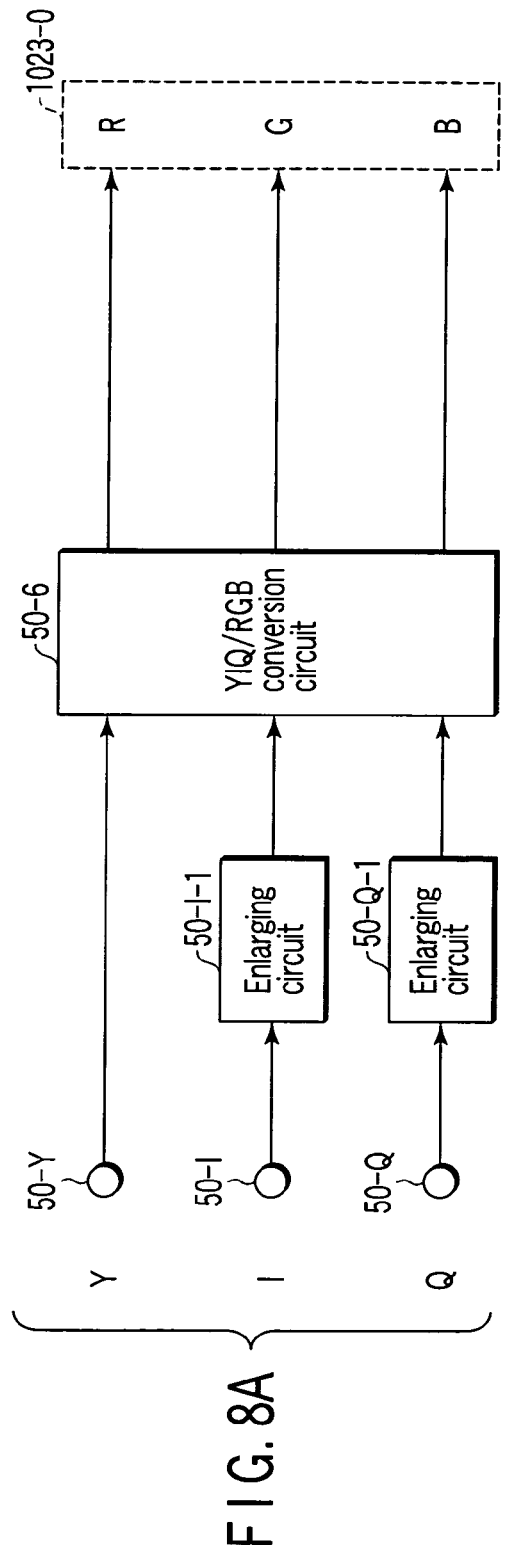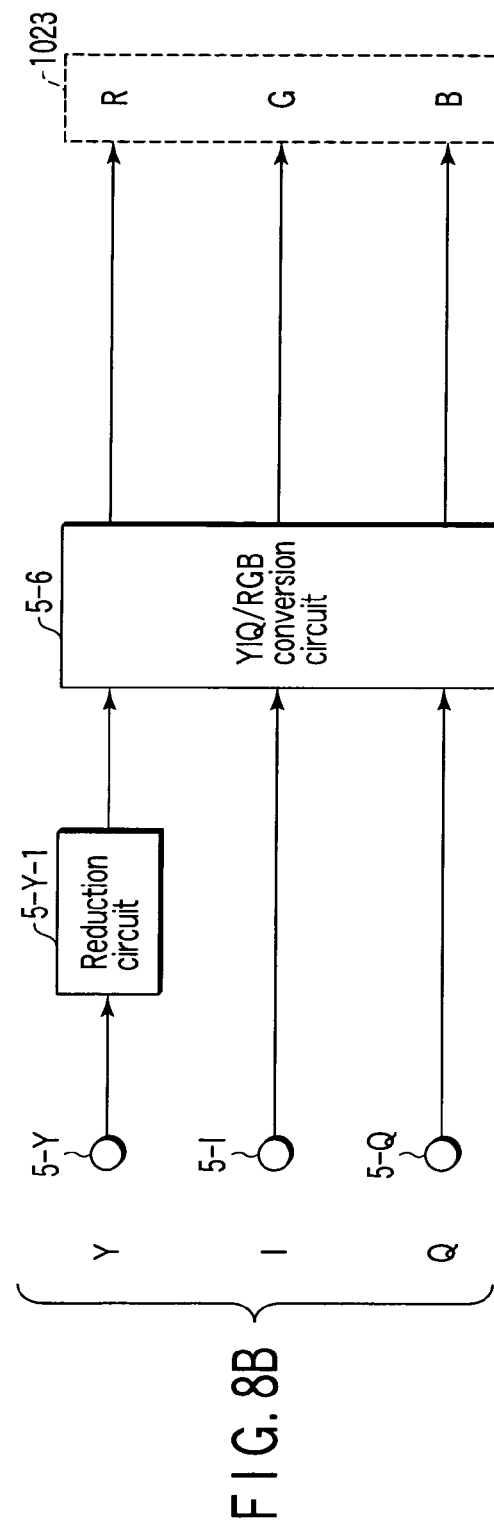
FIG. 8A
FIG. 8B

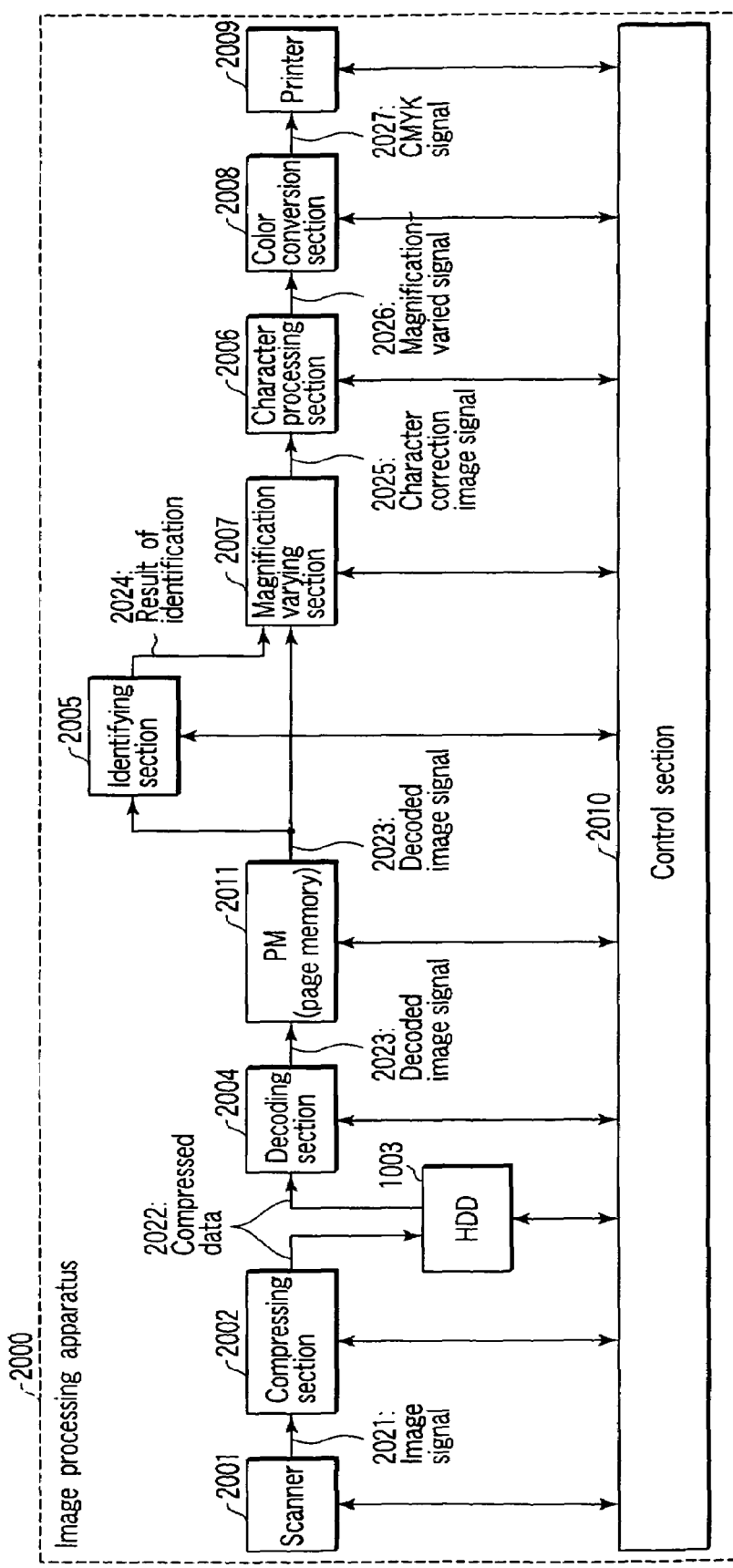
F I G. 13

IMAGE DATA PROCESSING APPARATUS AND METHOD

BACKGROUND OF THE INVENTION

1. Field of the Invention

This invention relates to an image data processing apparatus and an image data processing method, and more particularly to an apparatus and method which are applied effectively to an image processing apparatus, such as a copier, a printer, or an image scanner.

2. Description of the Related Art

Image information is generally compressed and stored for subsequent use because of its large volume. In the field of color image data processing technology, the Joint Photographic Experts Group (JPEG) method has been particularly popularized. Not only in the JPEG method but also in an irreversible color image data compression method, image data is generally converted into luminance and color-difference signals using human visual characteristics and the resolution of color difference is converted into a lower resolution than that of luminance, thereby compressing the data.

The decoded image is generally used as an image obtained by up-sampling the color difference and making the resolution of the color difference signal and that of luminance signal the same. The reason is that the input image size is made the same as the output image size to enable the output side to view the same image as that of the input.

On the output side, the process of outputting an image N times (as large or small as) the input image and the process of decoding a partial region are also included in a form of use of compressed data on the decoding side.

As described in reference 1 (Jpn. Pat. Appln. KOKAI Publication No. 2000-175061), a decoding method has been devised which uses the relationship between the resolution of luminance and that of color difference in returning the luminance and color difference signals to the RGB signals to reduce the number of data conversions. On the other hand, as for compression, a method has been devised which does not simply compress an image, but divides an image into a character area and a non-character area and uses different compression methods for the respective areas as described in reference 2 (Jpn. Pat. Appln. KOKAI Publication No. 2003-338934).

BRIEF SUMMARY OF THE INVENTION

However, in the technique disclosed in reference 1, the final decoded image is required to have the same size as that of the input image. In the method disclosed in reference 2, the property of the image to be processed has not been taken into account.

Specifically, no consideration has been given to a decoding method of using the decoded image in another image processing (e.g., compression described in reference 2), not displaying the decoded image as it is (what is important is that the image is visually acceptable). The compressed data obtained by down-sampling the color difference would be by no means inferior, if it were decoded without modification. However, the amount of information has been reduced as a result of down-sampling in terms of information content. Therefore, even if the image is decoded without change, followed by further image processing, the effect is reduced by half.

For example, in discrimination made in the copier or the like, the luminance component of a color image is extracted and the edge area is distinguished. However, even if the decoded image subjected to down-sampling compression is subjected to luminance/color difference conversion again, the luminance signal gets blunt and the accuracy decreases. Moreover, the processing requires the same memory and processing load as those before compression.

It is, accordingly, an object of the embodiments to provide a decoding apparatus and a decoding method which enable compressed data to be used efficiently by making the resolutions of the individual components different from one another.

According to an aspect of the present invention, there is provided a decoding apparatus decodes compressed data that represents an image signal composed of a plurality of components as a compressed code by making the resolutions of the individual components differ from one another, the decoding apparatus comprising: input sections 5-Y, 5-I, 5-Q which decode compressed data and take in the individual components independently; a reduction circuit 5-Y-1 which reduces and changes a size corresponding to the processing unit and resolution of any one of the components; and a conversion section 5-6 which converts into a decoded image signal in a specific format by using reduced components and uncompressed components.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a diagram to help explain the operation of lowering the resolution of a color different signal in a JPEG compression process;

FIG. 5 is a diagram to help explain the operation of the decoding circuit of FIG. 4;

FIG. 8A shows a configuration of a YIQ/RGB conversion section to help explain the characteristic of the present invention;

FIG. 8B shows a configuration of the YIQ/RGB conversion section according to the present invention;

FIG. 13 shows a configuration of a second embodiment of the present invention;

DETAILED DESCRIPTION OF THE INVENTION

Hereinafter, referring to the accompanying drawings, embodiments of the present invention will be explained.

Figure 1:
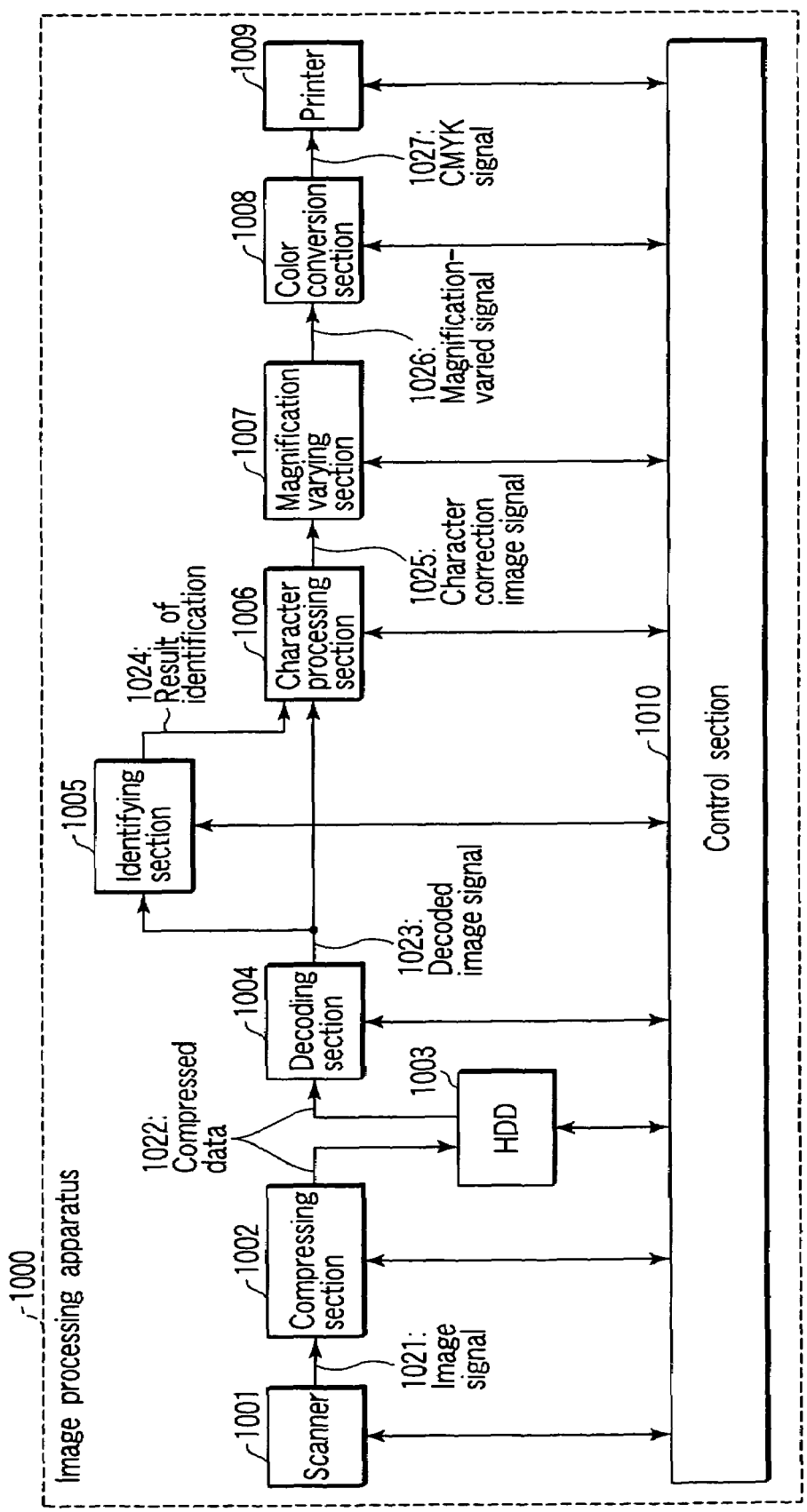
FIG. 1 shows a configuration of a first embodiment of the present invention.

FIG. 1 shows an embodiment of the present invention.

Number 1001 indicates a scanner which inputs red (R), green (G), and blue (B) color image signals. The image signals 1021 from the scanner 1001 are input to a compressing section 1002. The compressing section 1002 compresses the input image signals and outputs compressed signals 1022. The compressed signals 1022 are stored in a hard disk drive (HDD) HDD 1003.

The compressed signal 1022 read from the HDD 1003 is decoded at a decoding section 1004. The decoded signal 1023 decoded at the decoding section 1004 is input to an identifying section 1005 and a character processing section 1006.

The identifying section 1005 identifies an image signal as described later and outputs an identification signal 1024. Referring to the identification signal 1024, the character processing section 1006 processes the decoded signal. In this process, characters are processed so as to have a high image quality. The image signal 1025 improved in image quality is input to a magnification varying section 1007, which varies the magnification of the signal. The magnification-varied signal 1026 output from the magnification varying section 1007 is input to a color conversion section 1008, which converts the signal 1026 into a CMYK signal 1027 having a cyan (C) component, a magenta (M) component, and a yellow (Y) component. The CMYK signal 1027 output from the color conversion section 1008 is supplied to a printer 1009, which uses the signal 1027 as a print signal. A control section 1010 supervises control of all the configuration blocks.

Since the configuration excluding the compressing section 1002 and decoding section 1004 is the same as that of a known copier, the compressing section 1002 and decoding section which are the main part of the invention will be explained with reference to FIG. 2 and forward.

Figure 2:
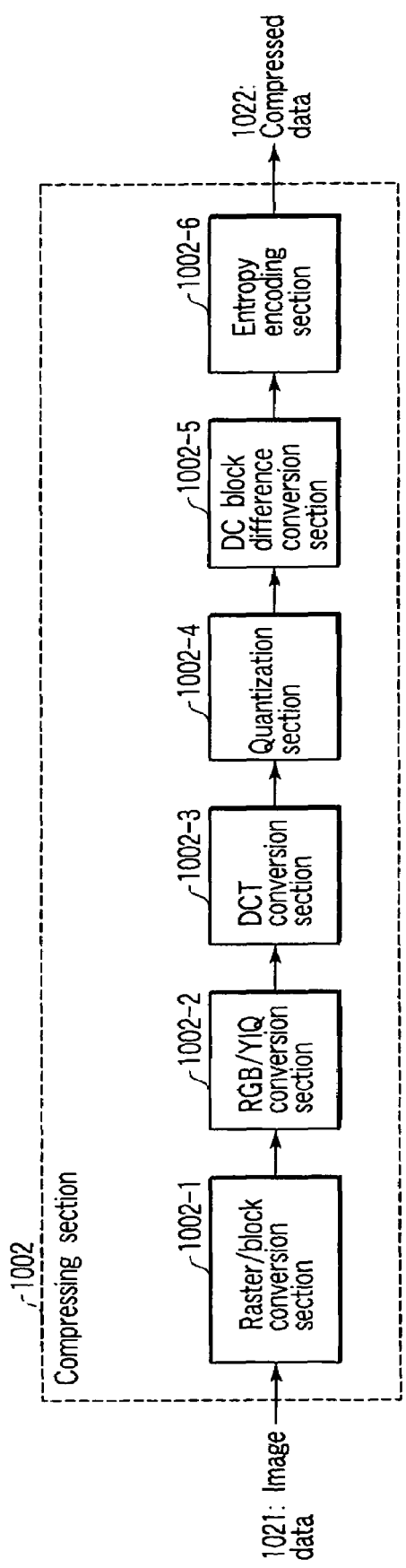
FIG. 2 shows a configuration of the compressing section 1002 of FIG. 1.

FIG. 2 shows the configuration blocks of the compressing section 1002 which performs JPEG compression. In JPEG compression, image data is turned into blocks by raster/block conversion 1002-1. The blocked image data is converted at an RGB/YIQ conversion section 1002-2 into a YIQ signal composed of a Y component (luminance signal), an I component (color difference signal), and a Q component (color difference signal). The YIQ signal is converted into a DCT signal at a DCT (discrete cosine transform) section 1002-3 and then is input to a quantization section 1002-4, thereby quantizing a DCT coefficient.

The output of the quantization section 1002-4 is input to a DC block difference conversion section 1002-5, which finds the difference from the preceding block in DC component. The DC difference AC signal output from the DC block difference conversion section 1002-5 is encoded at an entropy encoding section 1002-6, which outputs the result as compressed data 1022.

Generally, in color image irreversible encoding, including JPEG, the resolution of the color difference signal (IQ) is converted into a lower resolution than that of the luminance signal (Y) and then compressed, taking into account the visual characteristics of the luminance signal and color difference signal. This increases the compression efficiency.

As shown in FIG. 3, in the JPEG method, too, many parameters are used which compress the color difference signal by converting the size of the color difference signal into half the size of the luminance signal.

In FIG. 3, each of the uncompressed R, G, and B signals on the left side is processed in units of 16 pixels×16 pixels (step A). A Y signal produced using the RGB signals is also processed in units of 16 pixels×16 pixels (step B). However, the resolution of each of the converted color difference signals I, Q is further converted into processing units of 8 pixels×8 pixels, half the above size as shown on the right side of FIG. 3 (step C).

Specifically, the RGB/YIQ conversion section 1002-2 generates YIQ signals and then converts IQ into half of the number of pixels by an averaging process or the like. The processing unit at the DCT conversion section 1002-3 is 8 pixels×8 pixels. Therefore, when data before low-resolution conversion is converted into DCT, each of Y/I/Q signals has four blocks and a total of 12 blocks are to be compressed. However, as a result of resolution conversion as shown in FIG. 3, the Y signal has four blocks. Each of the I and Q signals has one block. A total of six blocks are to be processed. Since 6 blocks=(12 blocks/2), half the number of blocks before resolution conversion is to be compressed.

Figure 4:
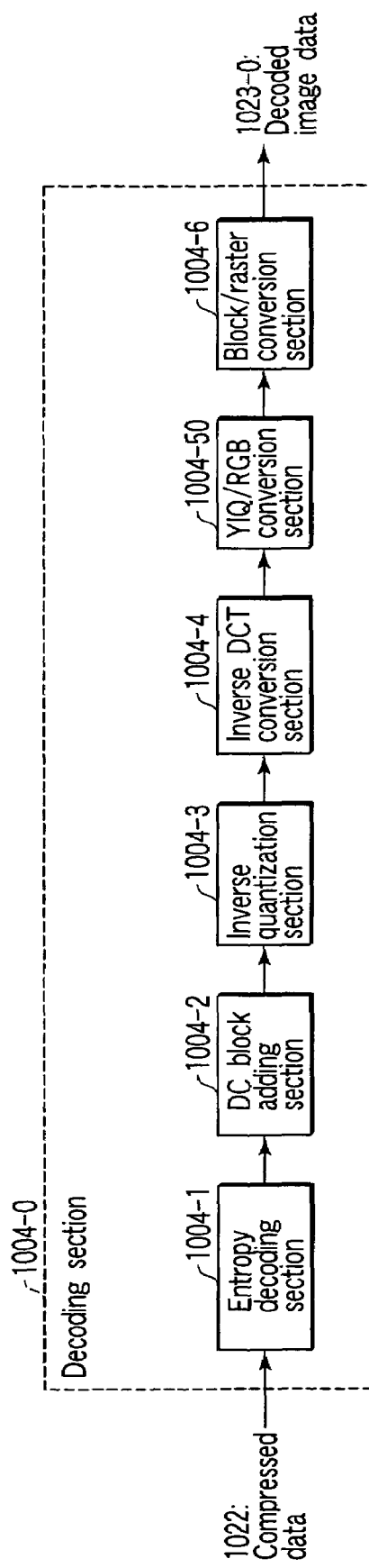
FIG. 4 shows a configuration of a JPEG decoding circuit.

FIG. 4 is a decoding section which decodes the JPEG image. Compressed data 1022 is decoded into a DC difference AC signal at the entropy decoding section 1004-1. The decoded DC difference AC signal is input to a DC block adding section 1004-2, which returns the DC difference AC signal to a quantization coefficient. The quantization coefficient is input to an inverse quantization section 1004-3, which returns the quantization coefficient to a DCT coefficient. The DCT coefficient is converted into a YIQ signal at an inverse DCT conversion section 1004-4. The YIQ signal is returned to an RGB signal at a YIQ/RGB conversion section 1004-50. The RGB signal is converted into image signals 1023 line by line at a block/cluster conversion section 1004-6.

FIG. 5 shows the operation of the YIQ/RGB conversion section 1004-50 (steps A, B, C). The color difference signals (I and Q) made lower in resolution are subjected to resolution conversion by a padding method or the like so that they may have the same number of pixels as that of the luminance signal. Using the color difference signals I, Q subjected to resolution conversion and the luminance signal Y, RGB signals are produced.

Figure 6:
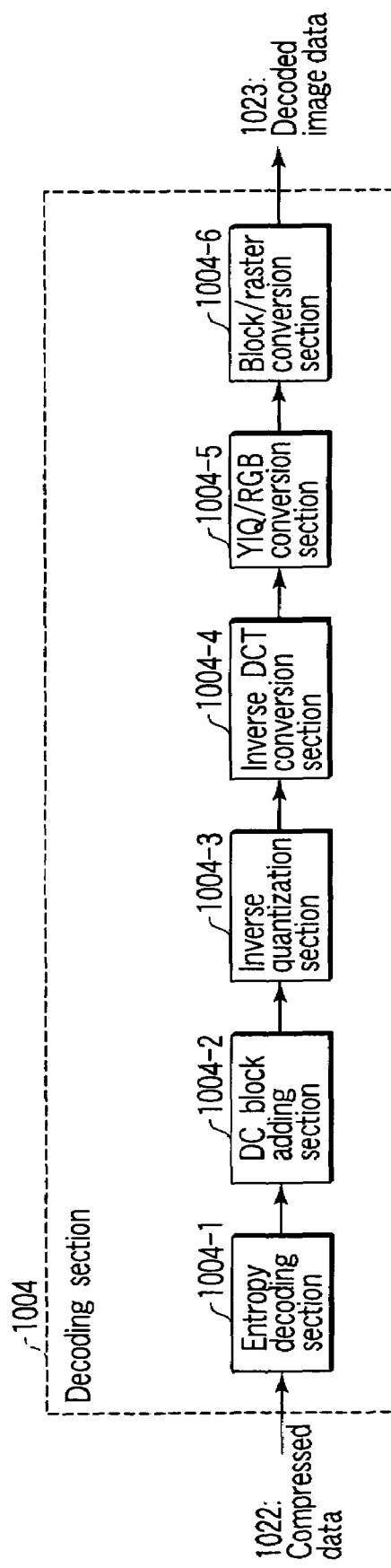
FIG. 6 shows a configuration of a decoding circuit according to the present invention.

FIG. 6 shows the decoding section 1004 of the invention. The YIQ/RGB conversion section 1004-50 shown in FIG. 4 has been replaced with a YIQ/RGB conversion section 1004-5. The remaining part is the same as that of the JPEG decoding section. Therefore, the same parts as those of FIG. 4 are indicated by the same reference symbols.

Figure 7:
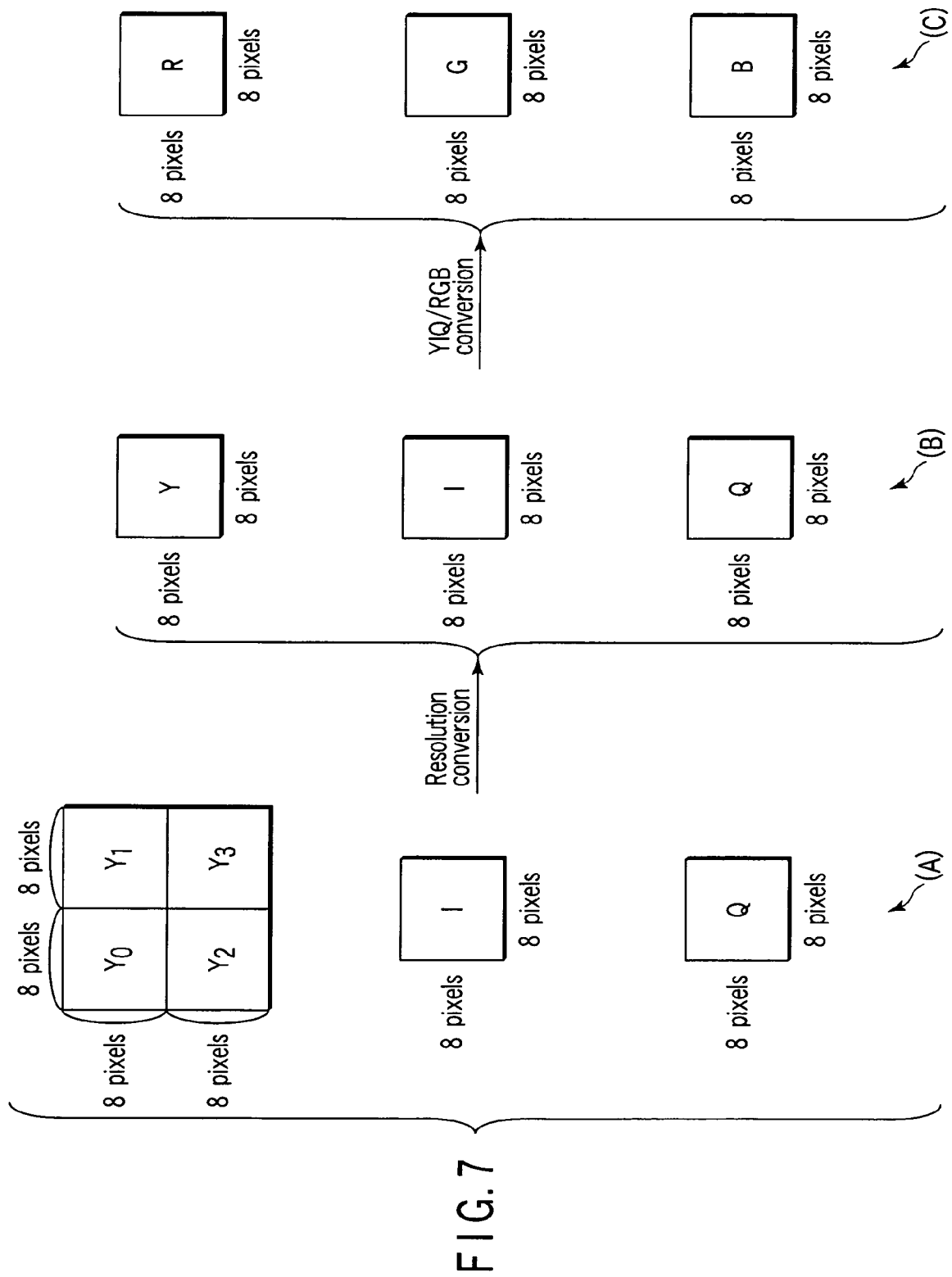
FIG. 7 is a diagram to help explain the operation of the decoding circuit of FIG. 6.

FIG. 7 is a diagram to help explain the operation of the YIQ/RGB conversion section 1004-5 (steps A, B, C). Unlike ordinary JPEG decoding, the YIQ/RGB conversion section is characterized by lowering the resolution of the luminance signal to that of the color difference signal by known averaging or the like to obtain an RGB signal 1023 with a lower resolution than that of the input data.

Specifically, as shown in FIG. 7, each of the color signals I, Q in the compressing stage has 8×8 pixels and the luminance signal Y has 16×16 pixels. Here, the luminance signal Y is converted from 16×16 pixels into 8×8 pixels. That is, the resolution of the luminance signal is lowered to that of the color difference signals.

FIG. 8A shows a configuration of the YIQ/RGB conversion section 1004-50 of FIG. 4.

The YIQ/RGB conversion section 1004-50 includes input sections 50-Y, 50-I, 50-Q to which the respective components are input. It further includes enlarging circuits 50-I-1, 50-I-2, 50-I-3 and a conversion circuit 50-6.

Immediately before converting the Y, I, Q signals into RGB signals, the YIQ/RGB conversion section 1004-50 enlarges the I, Q signals at the enlarging circuits 50-I-1, 50-I-2 respectively. That is, each of the I, Q signals is resolution-converted from 8×8 pixels into 16×16 pixels.

In contrast, FIG. 8B shows the YIQ/RGB conversion section 1004-5 of FIG. 6.

The YIQ/RGB conversion section 1004-5 includes input sections 5-Y, 5-I, 5-Q to which the respective components are input. However, the conversion section has a reduction circuit 5-Y-1. Numeral 5-6 indicates a YIQ/RGB conversion circuit.

Immediately before converting the Y, I, Q signals into RGB signals, the YIQ/RGB conversion section 1004-5 reduces the Y signal at the reduction circuit. That is, the resolution of the Y signal is lowered from 16×16 pixels to 8×8 pixels.

Therefore, in the present invention, since the resolution of the decoded image signal 1023 is lower than the input resolution, the signal is magnified variably to the input resolution at the magnification varying section 1007 and the resulting signal is used.

Next, the operations of the identifying section 1005, character processing section 1006, and magnification varying section 1007 which use the decoded signal will be explained, thereby clarifying the effect of the present invention.

To simplify the explanation, it is assumed that RGB/YIQ conversion is performed using equation 1, YIQ/RGB conversion is performed using equation 2, the size is 4×4, and there is no information loss at the DCT conversion section/quantization section. Even if the equations and size are different, the same effect as that of the present invention is basically produced.

$$\begin{vmatrix} Y \\ I \\ Q \end{vmatrix} = \begin{vmatrix} 0.25 & 0.5 & 0.25 \\ 1.0 & -1.0 & 0.0 \\ 0.0 & 1.0 & -1.0 \end{vmatrix} \begin{vmatrix} R \\ G \\ B \end{vmatrix} \quad (1)$$

$$\begin{vmatrix} R \\ G \\ B \end{vmatrix} = \begin{vmatrix} 1.0 & 0.75 & 0.25 \\ 1.0 & -0.25 & 0.25 \\ 1.0 & -0.25 & -0.75 \end{vmatrix} \begin{vmatrix} Y \\ I \\ Q \end{vmatrix} \quad (2)$$

Figure 9:
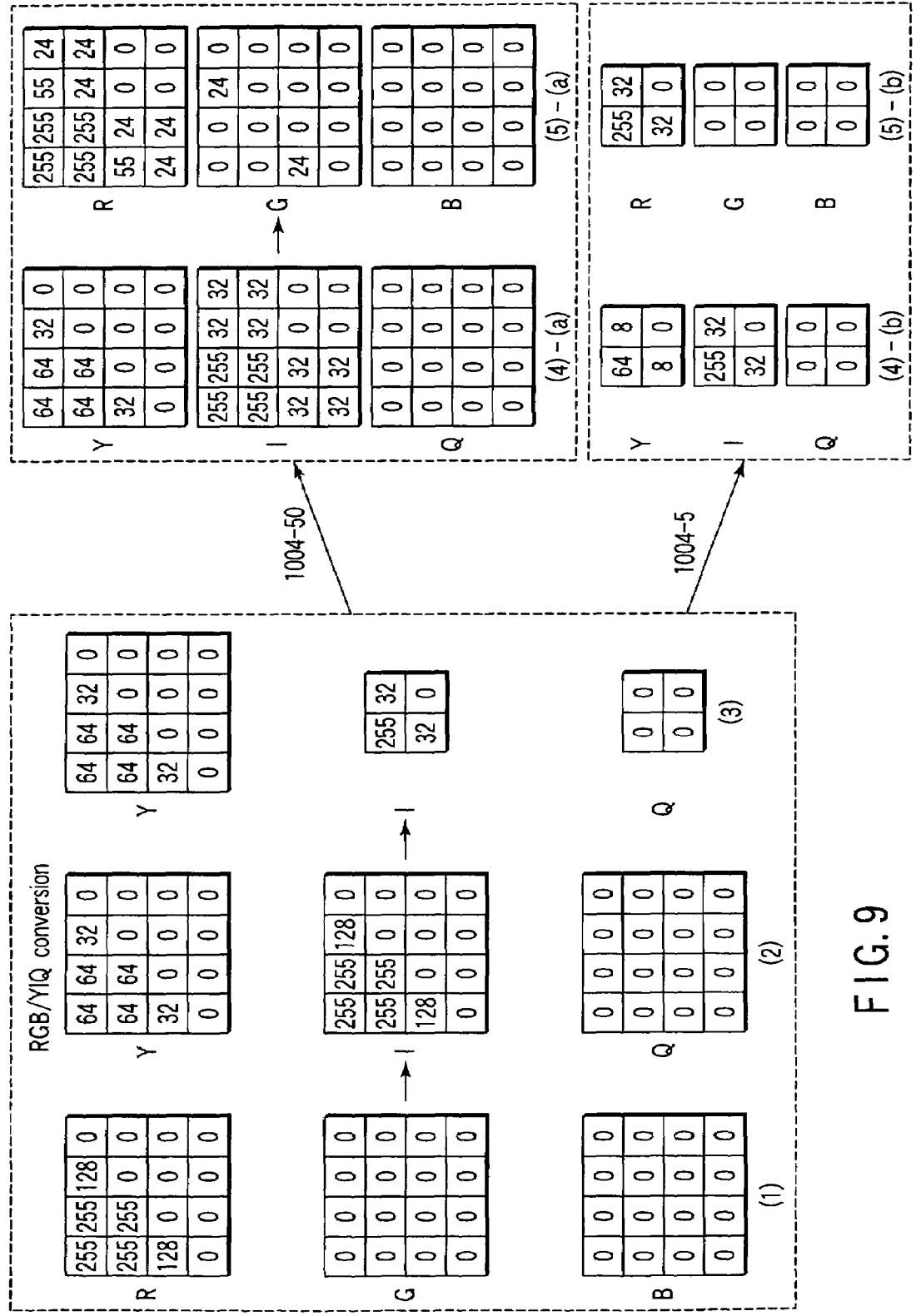
FIG. 9 is a diagram to help explain the operation of the YIQ/RGB conversion section shown in each of FIGS. 8A and 8B.

FIG. 9 shows the transition of data conversion when an image of a red character is input. The input image (step 1) is converted into YIQ signals at the RGB/YIQ conversion section (step 2), thereby lowering the resolution of IQ (step 3).

Since there is no loss in the present DCT conversion and quantization, the YIQ signal is converted directly at the YIQ/RGB conversion section. If the decoder 1004-5 is an ordinary one, the IQ signal is resolution-converted (step 4-*a*) and returned to RGB signals (step 5-*b*). In the embodiment, numeral 255 indicates high concentration and 0 indicates low concentration.

Figure 10:
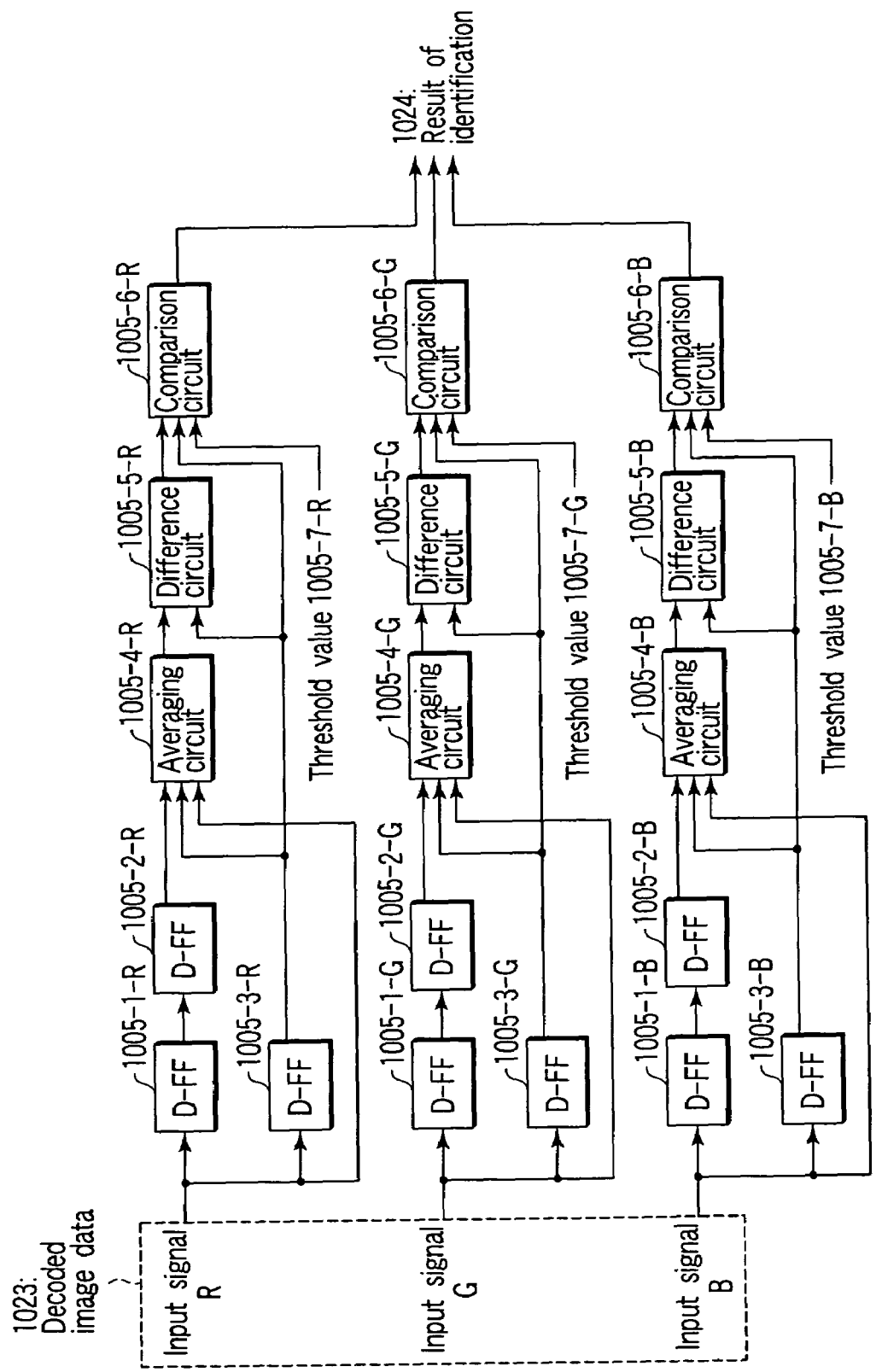
FIG. 10 shows a configuration of an identifying section 1005 according to the present invention.

The identifying section 1005 performs a known edge determining process. Specifically, as shown in FIG. 10, it is determined whether the target pixels indicate a character or a non-character, referring to the range of surrounding three pixels. In FIG. 10, the R, G, B systems have the same configuration, the R system will be explained as a representative of the other.

Specifically, data flip-flops D-FF 1005-1-4, 1005-2-R, 1005-3-4 support surrounding pixels and an averaging circuit 1005-4-R calculates the average. The average value of the averaging circuit 1005-4-R is input to a difference circuit 1005-5-R, which takes the absolute value of the difference between the average value and the processed pixel value. The absolute value is compared with a specific threshold value at a comparison circuit 1005-6-R. If the absolute value is larger than the threshold value, the comparison circuit determines that the target pixels seem to indicate a character and outputs "1". Otherwise, the comparison circuit determines that the target pixels do not indicate a character and outputs "0". As the result of identification 1024, the results of identification for the individual colors are output at the same time. The result of identification 1024 is input to the character processing section 1006 of FIG. 1.

Figure 11:
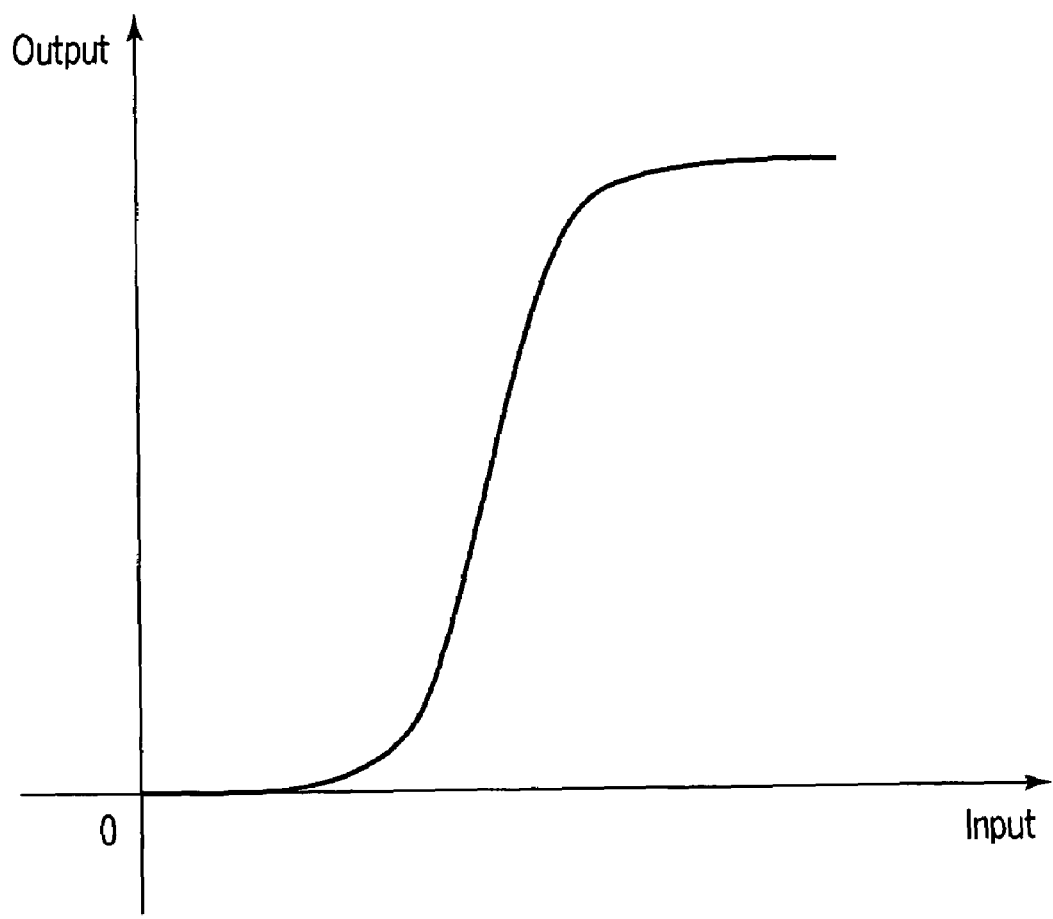
FIG. 11 is a diagram to help explain the operation of a character processing section 1006 according to the present invention.

When showing that the result of the identification 1024 has indicated a character, the character processing section 1006 performs a γ conversion process as shown in FIG. 11, thereby highlighting the character data.

Figure 12:
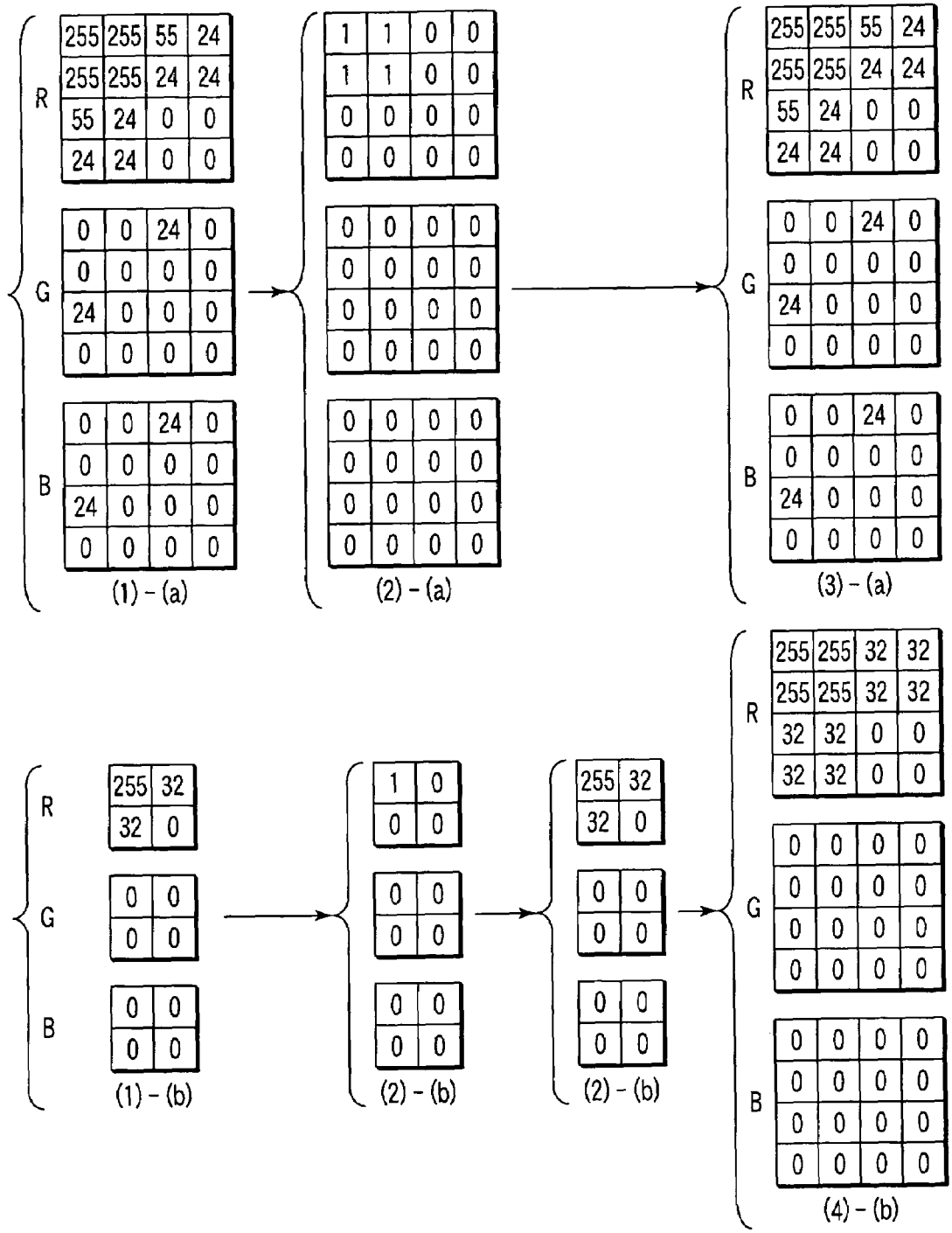
FIG. 12 is a diagram to help explain the operations of the identifying section 1005, the character processing section 1006, and a magnification varying section 1007.

FIG. 12 shows an image data converting operation on the basis of what has been explained in FIGS. 10 and 11. In steps 1-*a*, 2-*a*, and 3-*a* of FIG. 12, the decoded signal, the signal of the result of the identification, and the signal of the result of character processing when the YIQ/RGB conversion section 1004-50 of FIG. 4 is used are shown respectively. In contrast, in steps 1-*b*, 2-*b*, and 3-*b* of FIG. 12, the decoded signal, the signal of the result of the identification, and the signal of the result of character processing when the YIQ/RGB conversion section 1004-5 of FIG. 6 is used are shown respectively.

When the results of processing at both of the conversion sections are compared with each other, even if the conversion section 1004-50 decodes the input image with a high resolution (or input resolution), there is no difference between the result of identification at the conversion section 1004-50 and the result of identification at the conversion section 1004-5 because the resolution of the color difference signal has been lowered. Therefore, there is no difference between the result of character processing at the conversion section 1004-50 and that at the conversion section 1004-5.

In the present invention, since the result of decoding has 255 values, the γ conversion has no effect. Even if the result of decoding has other values, it is apparent that the difference becomes small, because the results of identification are similar.

As seen from FIG. 12, the conversion section 1004-5 processes the decoded image signal, while keeping it a low-resolution signal. Even if the number of pixels to be referred to is decreased at the identifying section, a similar effect to that of the conversion section 1004-50 can be produced. If the pixels to be referred to are made the same as those in ordinary decoding, a wider range can be referred to, which improves the identification accuracy.

As described above, the image data is decoded according to the lowest resolution of the compressed signal, decreasing the processing load on the decoding circuit, which reduces the circuit size and the calculation amount. Conversely, if the circuit size is not decreased and is kept as large as the conversion section 1004-50, the accuracy is improved.

While in the embodiment, both of the color difference signals I, Q (main and sub) are caused to have a ½ resolution, it is apparent that, even if one of the resolutions is made different, they are effective. Moreover, when the main and sub resolutions differ from each other, they are caused to have the same resolution by making either resolution equal to the lower one of them. With this resolution, even if the image data is decoded into low-resolution image data, the color difference signals are effective, although there is a difference in effect. Making the resolutions equal causes the processes after decoding to be simplified.

The compression and decoding method is, of course, not limited to the embodiment. The present invention may be applied to any method of performing compression and decoding by varying the resolution of each signal. The processing and method used for decoded image data are not limited to the embodiment.

FIG. 13 shows a configuration of still another embodiment of the present invention. The basic configuration and operation are the same as those of the preceding embodiment, except that a page memory 2011 is added and the position of the magnification varying section 2007 is replaced with that of the character processing section 2006.

While in the above embodiment, the resolution of the color difference signal has been lowered at the compressing section 20002, this embodiment causes compression to be selected for the case of lowering or not lowering the resolution according to the instruction given by the control section 2010.

The decoding section 2004 can decode a compressed signal obtained by lowering or not lowering the resolution of the color difference signal. The decoded signals differ a little from each other. The rest are the same as in the above embodiment.

Figure 14:
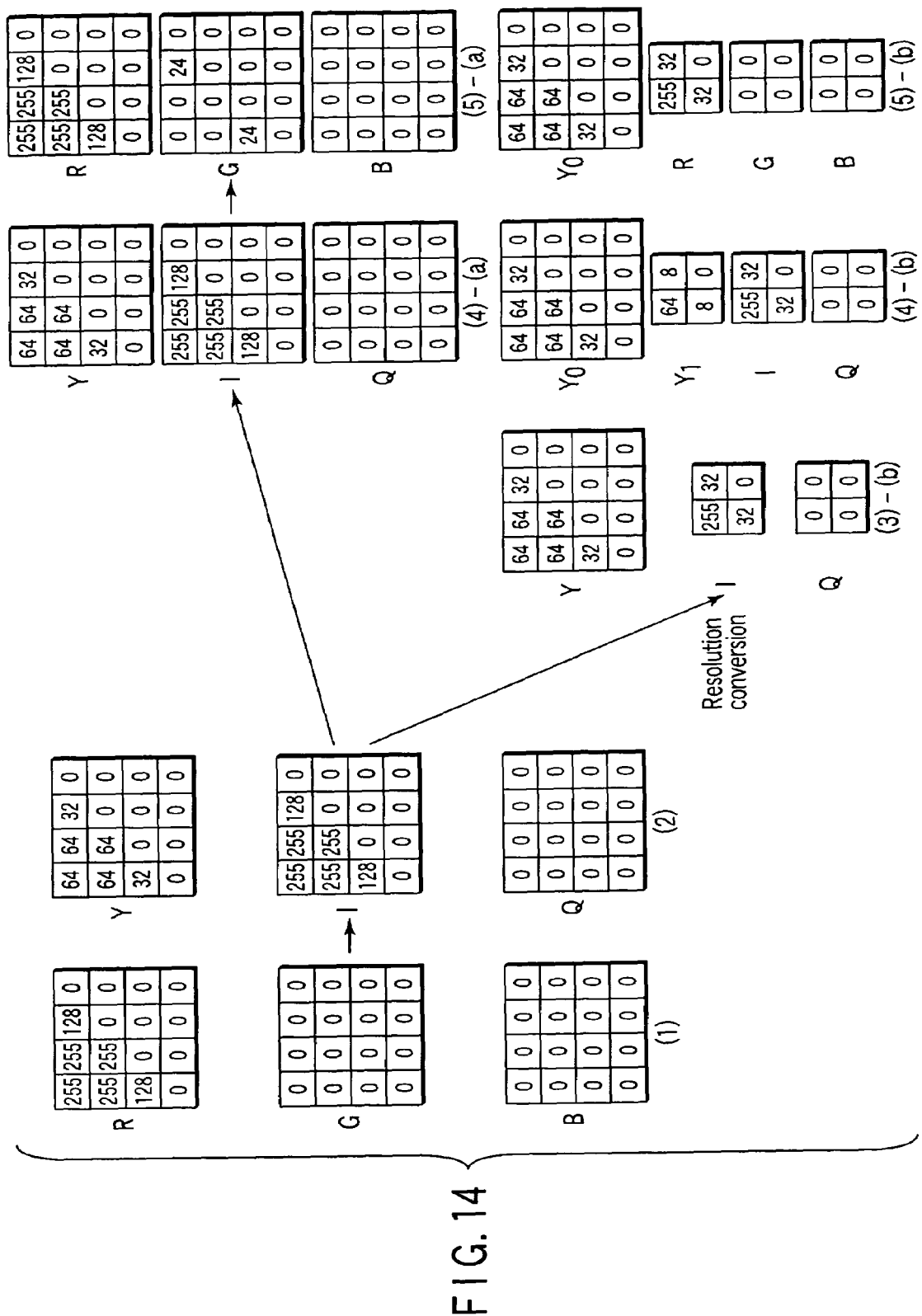
FIG. 14 is a diagram to help explain the operation of RGB/YIQ conversion when there is and there is not a low-resolution color difference signal.

FIG. 14 is a diagram to help explain the operation of the compressing section and decoding section in the cases of lowering and not lowering the resolution. In this embodiment, too, to simplify the explanation, it is assumed that there is no information loss at the DCT section and quantization section.

The RGB signals have been converted into YIQ signals (steps 1 to 2). The route where the YIQ signals are processed without low resolution conversion is the route of steps 4-*a* and 5-*a*. When the resolution is not lowered, there is no loss at the DCT section and quantization section. Therefore, the decoded image 2023 (step 5-*a*) is the same as the input image (step 1). Accordingly, the decoding is the same as the operation of an ordinary decoding section.

When the resolution is lowered and the data is processed, the YIQ signals are processed as shown in steps 3-*b* and 4-*b*. Specifically, the decoded image signals are in a state where a high-resolution Y signal and low-resolution IQ signals are present (step 3-*b*) and in a state where a low-resolution Y signal and low-resolution I, Q signals are present (step 4-*b*). Then, the final decoded image signal 2023 is composed of the low-resolution RGB signals and high-resolution Y signal (step 5-*b*).

Figure 15:
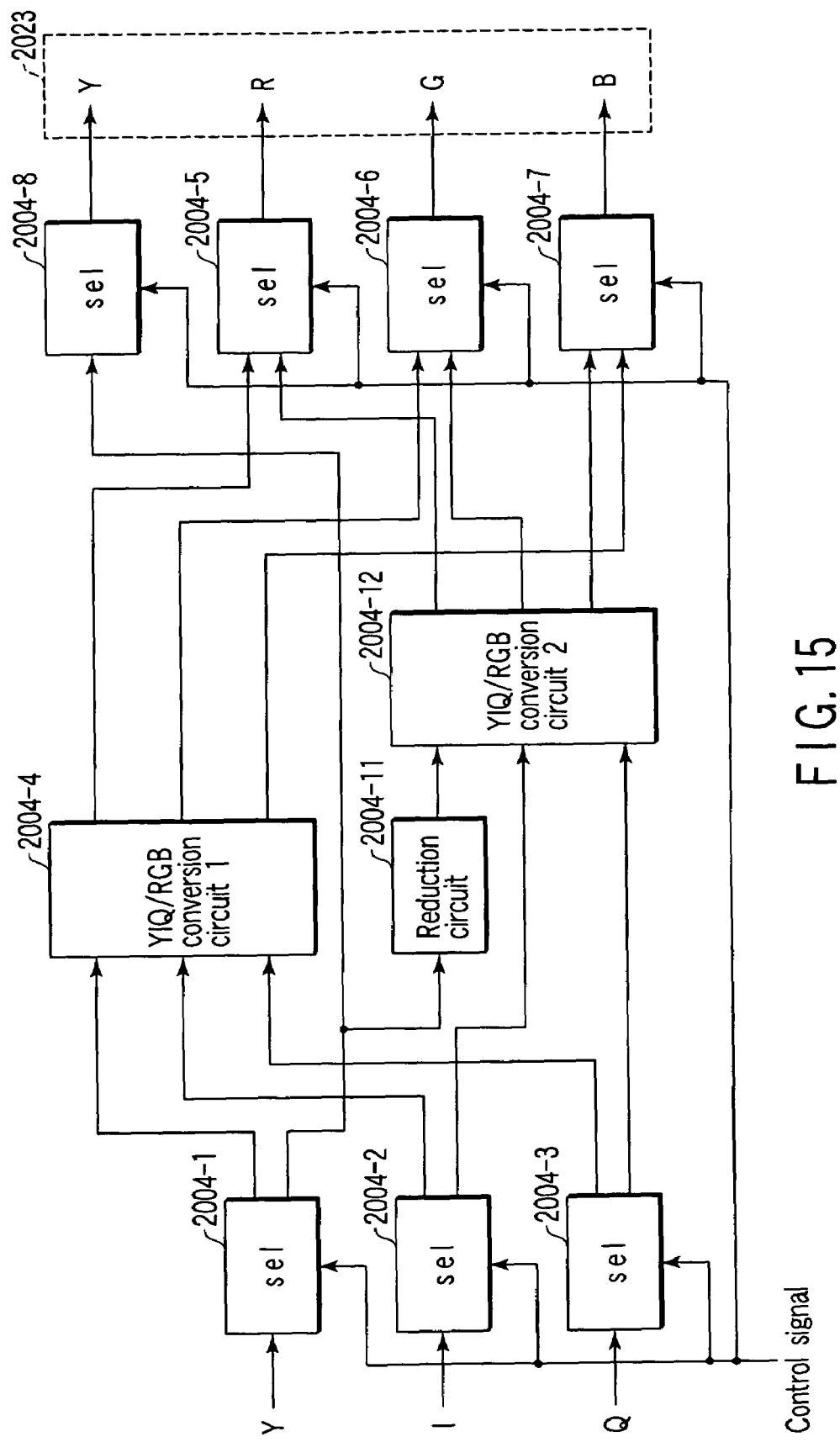
FIG. 15 shows a configuration of the YIQ/RBG conversion section to help explain the operation of FIG. 14.

FIG. 15 shows the YIQ/RGB conversion section in the decoding section 2004. The compressing section 2002 carries out the same operation as switching compression modes by known JPEG compression.

The control signal is a signal to indicate whether the compressed data has been lowered in resolution in terms of color difference.

When the resolution has not been lowered in terms of color difference, the Y, I, Q signals are input via selectors 2004-1, 2004-2, 2004-3 respectively to a YIQ/RGB conversion circuit 2004-4, which decodes them into RGB signals. The RGB signals are then output via selectors 2004-5, 2004-6, 2004-7 as high-resolution RGB decoded signals 2023.

When the color difference signal has been lowered in resolution, the YIQ signals are input to a YIQ/RGB conversion circuit 2004-12. In this case, the Y signal is reduced at a reduction circuit 2004-11, thereby matching the signal with the resolution of the color difference signal. The RGB signals converted there are output via the selector 2004-5, 2004-6, 2004-7 as low-resolution RGB decoded signals 2023. At the same time, an unreduced Y signal (Y0 in FIG. 14) is output via selector 2004-8.

Images are input in pages to a page memory (PM) 2011. If the input resolution is 600 dpi (7000×4000 pixels), a high-resolution RGB decoded signal requires a PM capacity of 7000×4000×3=84 MB. In addition, in the case of a high-resolution Y signal and low-resolution RGB decoded signals, 7000×4000+3500×2000×3=49 MB are required.

Figure 16:
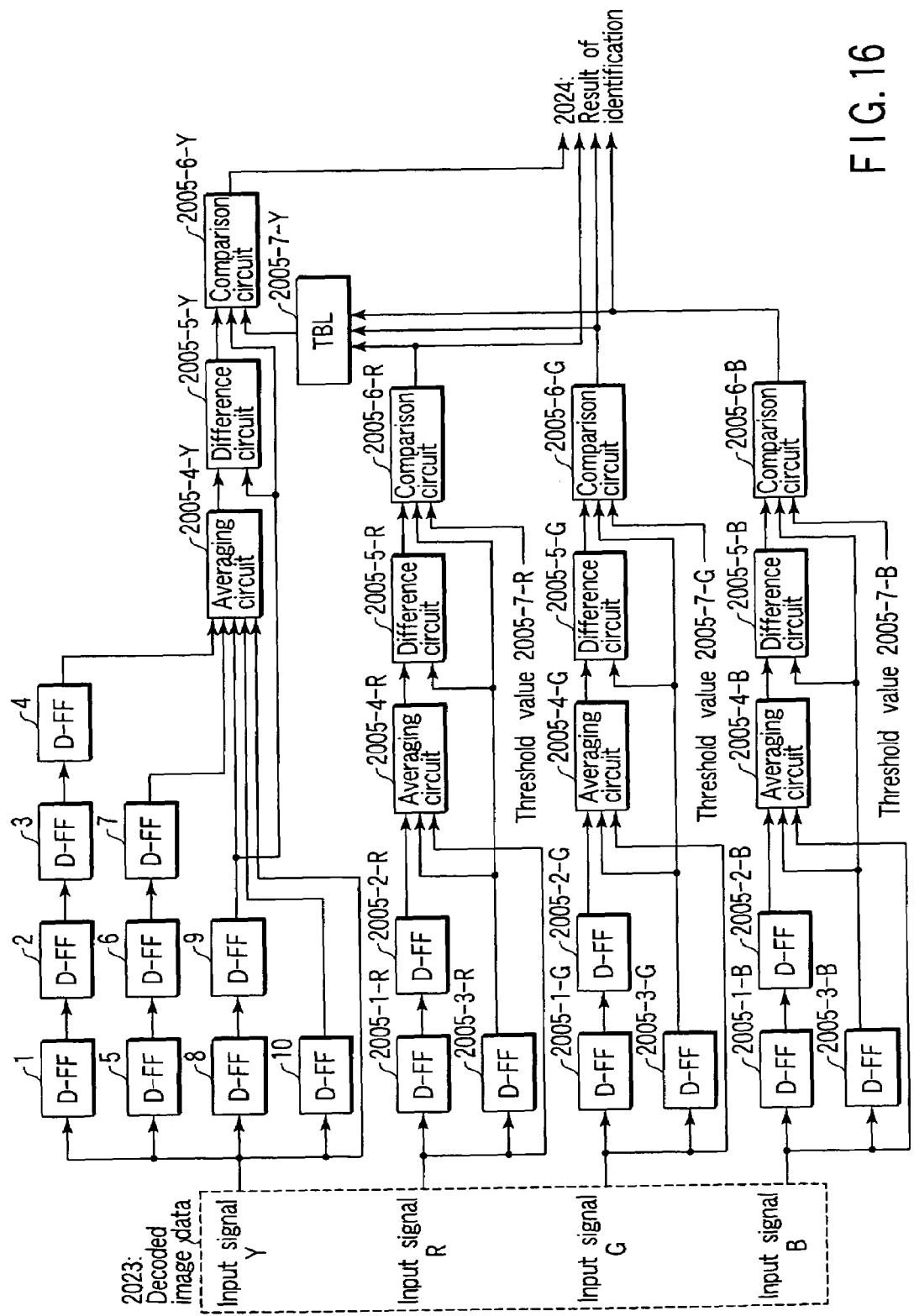
FIG. 16 shows a configuration of the identifying section 2005 of FIG. 13.

FIG. 16 shows a configuration of the identifying section 2005. The identifying section 2055 is the same as that of FIG. 10 in terms of the RGB signals. Therefore, as for each block, the same reference numerals as those in FIG. 10 are given and explanation of them will be omitted. Here, reference numeral 1005 in FIG. 10 is written as reference numeral 2005.

On the other hand, as for the Y signal, a reference range of pixels twice as large as that of the RGB signals is used. That is, D-FF1 to D-FF 10 are used. An averaging circuit 2005-Y averages the five values and outputs the average value to a difference circuit 2005-5-Y. Then, the difference circuit 2005-5-Y takes the absolute value of the difference between the value of a pixel at the center of the reference range and the average value. A comparison circuit 2005-6-Y compares the absolute output from the difference circuit 2005-5-Y with the threshold value. If the former is larger than the threshold value, the comparison circuit outputs a character decision output of 1. If the former is smaller than the threshold value, the comparison circuit outputs a non-character decision output of 0.

The threshold value for the Y signal is read from a TBL 2005-7-Y on the basis of the result of the decision of RGB.

For example, in the RGB systems, if only the R system has decided on a character and the rest have decided on a non-character, the luminance signal becomes relatively small and therefore the threshold value is decreased. If all of the RGB indicate characters, the luminance signal becomes larger and therefore the decision threshold value is increased.

In the case of high-resolution RGB decoded signals, only an RGB decision is made. In the case of a high-resolution Y signal and low-resolution RGB decoded signals, a YRGB decision is made.

The result of identification 2024 from the identifying section 2005 and the decoded image signal 2023 are input to the magnification varying section 2007. Only in the case of high-resolution luminance and low-resolution RGB decoded signals, the magnification varying section 2007 varies the magnification of the low-resolution RGB signals and that of the result of identification for the low-resolution RGB signals.

Figure 17:
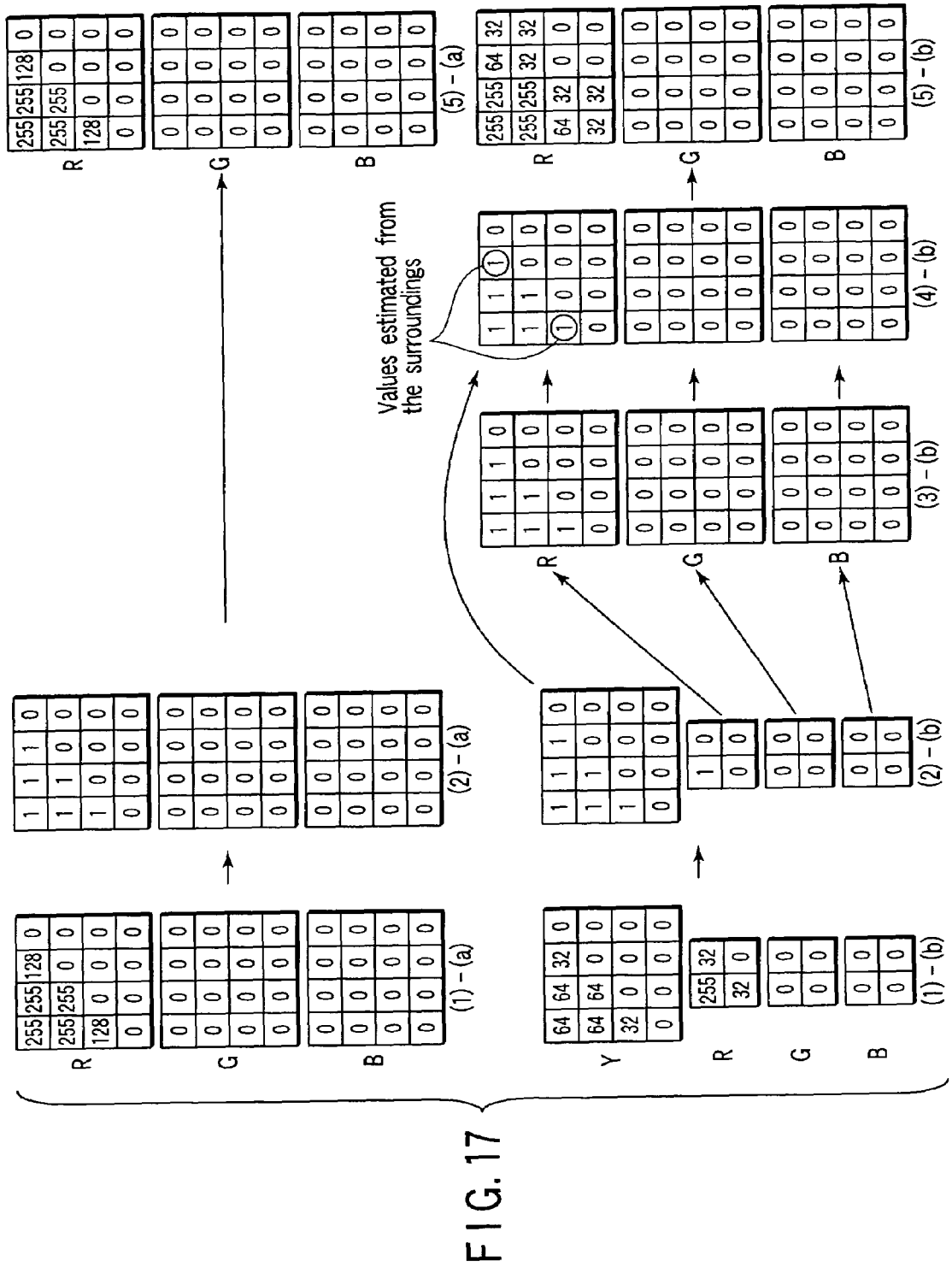
FIG. 17 is a diagram to help explain the operations of the identifying section 2005, character processing section 2006, and magnification varying section 2007 when there is and there is not a low-resolution color difference signal.

FIG. 17 shows an example of the operation on the basis of the result of identification. When high-resolution RGB decoded signals (step 1-*a*) are processed, the result of the decision (step 2-*a*) is used without change, thereby obtaining character correction image signals (step 5-*a*).

When high-resolution luminance and low-resolution RGB decoded signals 1-b are processed, the Y signal and RGB signal are subjected to character identification (step 2-*b*). Then, the result of low-resolution identification is varied in magnification (step 3-*b*) and then is combined with the result of high-resolution luminance identification, thereby obtaining the result of high-resolution identification (step 4-b). The low-resolution RGB signals are similarly varied in magnification, thereby obtaining a high-resolution RGB signals, which makes it possible to obtain character correction image signals from both of the high-resolution data (step 5-b).

In the embodiment, the resolution of the result of identification is increased by calculating a logical product (AND) of the luminance and the low-resolution RGB. In addition, when luminance identification is for characters and there is no character identification in the low-resolution identification, priority is given to luminance identification and the relevant colorplate is estimated from the surroundings. This invention is not limited to this. While in the embodiment, only the result of identification has been corrected in the high-resolution luminance signal, the low-resolution RGB signals may be corrected. In the embodiment, although images have been stored in the PM, a small range referring method has been used in identification as in the embodiment of FIG. 1. It goes without saying that use of all the image information in identification is more effective. When a low-resolution signal and a high-resolution signal are present, information on the high-resolution signal is used in a part of the low resolution, thereby enabling the low-resolution signal to have a high quality.

While in the embodiment, only color images have been handled, it is clear that the same way of thinking can be extended to the switching between color and gray.

As described above, since the decoding resolutions and color signals are switched according to the resolution of each color of the compressed data, the memory source can be used efficiently. In addition, the process of using decoded images, such as identification, can be performed with higher accuracy.

As described above, the present invention are identified by the following 1a to 1d:

(1a) A decoding apparatus which decodes compressed data that represents an image signal composed of a plurality of components as a compressed code by making the resolutions of the individual components differ from one another, comprises:

(1b) input sections 5-Y, 5-I, 5-Q which decode compressed data and take in the individual components independently;

(1c) a reduction circuit 5-Y-1 which reduces and changes a size corresponding to the processing unit and resolution of any one of the components; and (1d) a conversion section 5-6 which converts into a decoded image signal in a specific format by using reduced components and uncompressed components. With this configuration, the decoding apparatus produces a decoded image according to the resolution of each signal of the compressed data, which reduces the burden of processing the decoded image.

In addition to the above basic configuration, (2a) the reduction circuit (5-6) reduces the size according to the lowest resolution of the plurality of components. Since a decoded image is produced with the lowest resolution in the compressed data, the burden of processing the decoded image and the processing accuracy are in balance.

Moreover, in addition to the above basic configuration, (3a) said plurality of components include main and sub components, and (3b) the reduction circuit 5-6 performs decoding in such a manner that the resolutions of the main and sub components are made equal to the lowest resolution of the components. Since the main balance and sub balance of the resolution of the decoded signal are made the same, the burden of processing the decoded image is reduced.

Furthermore, in addition to the above basic configuration, (4a) the conversion section (5-6) includes a circuit which decodes a signal with the highest resolution of the components. With this circuit, since the decoded image is obtained by decoding the highest resolution image and the lowest resolution image, the load section which processes the decoded image is reduced and its accuracy is improved.

Still furthermore, in addition to the above basic configuration, (5a) a decoding apparatus, which decodes compressed data that represents an image signal composed of a plurality of components as a compressed code by making the resolutions of the individual components differ from one another, is characterized by outputting a plurality of decoded images according to the number of and the resolutions of the components. Since decoded images are switched according to the number of and the resolutions of compressed signals, the image information can be used efficiently.

By the above means, decoded image are produced according to the resolution of each signal of the compressed data, which reduces the burden of processing the decoded images.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A decoding apparatus which decodes compressed data that represents an image signal composed of a plurality of components as a compressed code by making the resolutions of the individual components differ from one another, the decoding apparatus comprising:
   an input section which decodes compressed data and takes in the individual components independently;
   a reduction circuit which reduces and changes a size corresponding to the processing unit and resolution of any one of the components, and reduces the size according to the lowest resolution of said plurality of components; and
   a conversion section which converts into a decoded image signal in a specific format by using reduced components and uncompressed components.

2. The decoding apparatus according to claim 1, wherein said plurality of components include main and sub components, and
   the reduction circuit performs decoding in such a manner that the resolutions of the main and sub components are made equal to the lowest resolution of the components.

3. The decoding apparatus according to claim 1, wherein the conversion section further includes a circuit which decodes a signal with the highest resolution of the components.

4. The decoding apparatus according to claim 1, further comprising a plurality of decoded image processing sections corresponding to the number of the components and the resolutions of the respective components.

5. A decoding method which decodes compressed data that represents an image signal composed of a plurality of components as a compressed code by making the resolutions of the individual components differ from one another, the decoding method comprising:
   taking in independently from an input section the individual components obtained by decoding the compressed data;
   causing a reduction circuit to reduce and change a size corresponding to the processing unit and resolution of any one of the components, and to reduce the size according to the lowest resolution of said plurality of components; and causing a conversion section to convert into a decoded image signal in a specific format by using reduced components and uncompressed components.

6. The decoding method according to claim 5, wherein said plurality of components include main and sub components, and the reduction circuit performs decoding in such a manner that the resolutions of the main and sub components are made equal to the lowest resolution of the components.

7. The decoding method according to claim 5, wherein the conversion section further decodes a signal with the highest resolution of the components.

8. The decoding method according to claim 5, further obtaining a decoded output according to the number of the components and the resolutions of the respective components.

9. A decoding apparatus which decodes compressed data that represents an image signal composed of a plurality of components as a compressed code by making the resolutions of the individual components differ from one another, the decoding apparatus comprising:

input means which decodes compressed data and takes in the individual components independently;

reduction means which reduces and changes a size corresponding to the processing unit and resolution of any one of the components, and reduces the size according to the lowest resolution of said plurality of components; and conversion means which converts into a decoded image signal in a specific format by using reduced components and uncompressed components.

* * * * *